US011290253B2

(12) United States Patent
Samid

(10) Patent No.: US 11,290,253 B2
(45) Date of Patent: Mar. 29, 2022

(54) DOCUMENT MANAGEMENT CRYPTOGRAPHY

(71) Applicant: Gideon Samid, Rockville, MD (US)

(72) Inventor: Gideon Samid, Rockville, MD (US)

( * ) Notice: Subject to any disclaimer, the term of this patent is extended or adjusted under 35 U.S.C. 154(b) by 0 days.

(21) Appl. No.: 17/163,553

(22) Filed: Jan. 31, 2021

(65) Prior Publication Data

US 2021/0281393 A1 Sep. 9, 2021

Related U.S. Application Data

(63) Continuation-in-part of application No. 16/792,093, filed on Feb. 14, 2020, now Pat. No. 10,911,215.

(51) Int. Cl.
*H04L 9/06* (2006.01)
*H04L 9/32* (2006.01)

(52) U.S. Cl.
CPC .......... *H04L 9/0618* (2013.01); *H04L 9/3247* (2013.01)

(58) Field of Classification Search
CPC ... H04L 9/0618; H04L 9/3247; H04L 9/0833; H04L 9/0891; G09C 1/02
See application file for complete search history.

(56) References Cited

U.S. PATENT DOCUMENTS

| | | | | |
|---|---|---|---|---|
| 6,574,657 B1 * | 6/2003 | Dickinson | ............... | G06F 8/658 709/203 |
| 7,725,490 B2 * | 5/2010 | Hitchen | .............. | G06F 21/6218 707/783 |
| 8,667,273 B1 * | 3/2014 | Billstrom | ............ | H04L 63/0428 713/165 |
| 8,677,132 B1 * | 3/2014 | Liao | ....................... | H04L 9/3226 713/176 |
| 9,424,249 B1 * | 8/2016 | Grigsby | ................ | G06F 40/131 |
| 10,387,669 B1 * | 8/2019 | Lim | ....................... | G06F 21/604 |
| 10,621,346 B1 * | 4/2020 | Singh | .................... | H04L 9/3239 |
| 10,664,606 B2 * | 5/2020 | Drey | ..................... | G06F 21/602 |
| 10,884,977 B1 * | 1/2021 | Shahin | ................. | G06F 16/113 |
| 2003/0112273 A1 * | 6/2003 | Hadfield | ................ | G06Q 10/10 715/751 |
| 2003/0159045 A1 * | 8/2003 | Nishimoto | ........... | G06F 21/645 713/176 |
| 2003/0217275 A1 * | 11/2003 | Bentley | ................... | G06F 21/10 713/184 |
| 2004/0120525 A1 * | 6/2004 | Miskimmin | ......... | G06F 21/604 380/277 |
| 2004/0205653 A1 * | 10/2004 | Hadfield | ............... | G06Q 10/10 715/255 |
| 2005/0010607 A1 * | 1/2005 | Parker | .................... | G06Q 10/10 |
| 2005/0223008 A1 * | 10/2005 | Kubota | .............. | G06F 21/6218 |
| 2006/0282372 A1 * | 12/2006 | Endres | .................. | G07F 7/1008 705/38 |
| 2007/0038857 A1 * | 2/2007 | Gosnell | ................. | G06F 16/113 713/165 |
| 2007/0130166 A1 * | 6/2007 | Takahashi | ............... | G06F 16/93 |

(Continued)

*Primary Examiner* — Aravind K Moorthy

(57) ABSTRACT

Using composite cipher technology a single ciphertext C will decrypt to plaintext Pi using key Ki, and to plaintext $Pj \neq Pi$ using key $Kj \neq Ki$, thereby a single file C will carry any number of distinct messages so that each key holder will see in C the message intended for them. Applicable for complex project management where frequent changes and large number of people are involved. Also in email systems where a single email will deliver a shared message plus individual messages to selected readers.

9 Claims, 5 Drawing Sheets

DMC Email Illustration

(56) References Cited

U.S. PATENT DOCUMENTS

| | | | |
|---|---|---|---|
| 2007/0180084 A1* | 8/2007 | Mohanty | G06F 11/1464 709/223 |
| 2008/0005024 A1* | 1/2008 | Kirkwood | G06Q 40/00 705/50 |
| 2008/0021936 A1* | 1/2008 | Reynolds | G06F 21/64 |
| 2008/0192924 A1* | 8/2008 | Shang | H04L 9/0618 380/28 |
| 2008/0301471 A1* | 12/2008 | Demarest | H04L 63/12 713/193 |
| 2008/0301757 A1* | 12/2008 | Demarest | G06Q 10/10 726/1 |
| 2009/0055643 A1* | 2/2009 | Brown | H04L 9/3263 713/160 |
| 2010/0191983 A1* | 7/2010 | Yami | G06F 21/608 713/193 |
| 2012/0042018 A1* | 2/2012 | Singh | H04L 9/3247 709/206 |
| 2012/0054491 A1* | 3/2012 | Tippett | H04L 9/3213 713/168 |
| 2012/0072723 A1* | 3/2012 | Orsini | H04L 63/10 713/165 |
| 2012/0185701 A1* | 7/2012 | Balinsky | G06F 21/6209 713/193 |
| 2012/0216046 A1* | 8/2012 | McDougal | H04L 63/1441 713/183 |
| 2012/0233252 A1* | 9/2012 | Vats | H04L 63/12 709/204 |
| 2012/0278631 A1* | 11/2012 | Balinsky | H04L 9/0869 713/189 |
| 2012/0303968 A1* | 11/2012 | Balinsky | H04L 9/3247 713/189 |
| 2012/0317145 A1* | 12/2012 | Reghetti | G06F 21/6209 707/781 |
| 2013/0097421 A1* | 4/2013 | Lim | G06F 21/602 713/167 |
| 2013/0305039 A1* | 11/2013 | Gauda | G06F 21/6218 713/153 |
| 2013/0332723 A1* | 12/2013 | Tan | H04L 63/0807 713/150 |
| 2014/0013112 A1* | 1/2014 | Cidon | G06F 16/137 713/165 |
| 2014/0019497 A1* | 1/2014 | Cidon | G06F 16/182 707/827 |
| 2014/0019498 A1* | 1/2014 | Cidon | G06F 16/10 707/827 |
| 2014/0047556 A1* | 2/2014 | Davis | G06F 21/606 726/28 |
| 2014/0068254 A1* | 3/2014 | Scharf | G06F 21/6218 713/165 |
| 2014/0101434 A1* | 4/2014 | Senthurpandi | G06F 21/32 713/150 |
| 2014/0115332 A1* | 4/2014 | Crosbie | G06F 21/6218 713/167 |
| 2014/0164776 A1* | 6/2014 | Hook | G06F 21/6218 713/171 |
| 2014/0189483 A1* | 7/2014 | Awan | H04L 63/10 715/212 |
| 2014/0189818 A1* | 7/2014 | Meyer | H04L 63/08 726/4 |
| 2014/0201145 A1* | 7/2014 | Dorman | G06F 16/27 707/634 |
| 2014/0245015 A1* | 8/2014 | Velamoor | G06F 21/10 713/171 |
| 2014/0258719 A1* | 9/2014 | Cidon | G06F 16/182 713/165 |
| 2014/0280403 A1* | 9/2014 | Swansegar | G06F 16/9577 707/827 |
| 2014/0379641 A1* | 12/2014 | Kinsman | G06F 16/178 707/610 |
| 2015/0006400 A1* | 1/2015 | Eng | H04L 9/0631 705/51 |
| 2015/0006474 A1* | 1/2015 | Halder | G06F 16/93 707/608 |
| 2015/0007264 A1* | 1/2015 | Maldaner | H04L 67/1097 726/3 |
| 2015/0113279 A1* | 4/2015 | Andersen | G06F 21/6218 713/171 |
| 2015/0121063 A1* | 4/2015 | Maller | H04L 63/045 713/153 |
| 2015/0127607 A1* | 5/2015 | Savage | G06F 16/178 707/610 |
| 2015/0169500 A1* | 6/2015 | Balinsky | G06F 16/93 715/209 |
| 2015/0178007 A1* | 6/2015 | Moisa | G06F 16/25 713/190 |
| 2015/0310219 A1* | 10/2015 | Haager | H04L 9/0869 713/165 |
| 2016/0321290 A1* | 11/2016 | Luthra | G06F 16/9574 |
| 2016/0335420 A1* | 11/2016 | Bain | G06F 21/645 |
| 2017/0048059 A1* | 2/2017 | Murray | H04L 9/065 |
| 2017/0060936 A1* | 3/2017 | Gammans | G06F 16/2358 |
| 2017/0078094 A1* | 3/2017 | Olson | H04L 9/0825 |
| 2017/0093817 A1* | 3/2017 | Khoury | H04L 63/105 |
| 2017/0286702 A1* | 10/2017 | Cheung | H04L 63/0853 |
| 2017/0317818 A1* | 11/2017 | Kurian | G06F 11/07 |
| 2017/0364691 A1* | 12/2017 | Zhang | H04W 4/12 |
| 2018/0025026 A1* | 1/2018 | Shaw, Jr. | G06F 16/183 707/626 |
| 2018/0048464 A1* | 2/2018 | Lim | H04L 63/061 |
| 2018/0048474 A1* | 2/2018 | Landrock | G06F 21/35 |
| 2018/0219841 A1* | 8/2018 | Nadler | H04L 9/0637 |
| 2018/0262480 A1* | 9/2018 | Doi | G06F 21/6245 |
| 2018/0268155 A1* | 9/2018 | Kamiya | G06F 21/335 |
| 2018/0276399 A1* | 9/2018 | Hakamata | G06F 21/6227 |
| 2018/0330120 A1* | 11/2018 | Ray | G06F 21/6209 |
| 2019/0005262 A1* | 1/2019 | Surla | G06F 3/0623 |
| 2019/0109857 A1* | 4/2019 | Caffary, Jr. | H04W 12/069 |
| 2019/0114182 A1* | 4/2019 | Chalakudi | H04L 63/0435 |
| 2019/0149333 A1* | 5/2019 | Harnik | H04L 9/3234 713/176 |
| 2019/0171841 A1* | 6/2019 | Steinfeld | H04L 9/0618 |
| 2020/0074105 A1* | 3/2020 | Gordon | H04L 63/105 |
| 2020/0076877 A1* | 3/2020 | Stringham | G06F 21/6218 |
| 2020/0097443 A1* | 3/2020 | Kamiya | G06F 16/1794 |
| 2020/0112548 A1* | 4/2020 | Samid | H04L 9/0836 |
| 2020/0159947 A1* | 5/2020 | Shenefiel | G06F 21/6218 |
| 2020/0314104 A1* | 10/2020 | Achyuth | G06F 21/32 |
| 2020/0349261 A1* | 11/2020 | Koorella | G06F 21/6209 |
| 2021/0036975 A1* | 2/2021 | Shtendel | H04L 9/3247 |
| 2021/0056233 A1* | 2/2021 | Camery | G06Q 10/101 |

* cited by examiner

DMC Email Illustration

DMC Configuration

DMC BitMap Configuration

Document Visibiliy Groups

DOCUMENT MANAGEMENT CRYPTOGRAPHY

BRIEF SUMMARY OF THE INVENTION

This invention applies the technology of composite cipher described in the continued application and in U.S. Pat. Nos. 10,541,808, 10,728,028, where a given ciphertext C will be decrypted to plaintext Pi using a cryptographic key Ki, for i=1,2, . . . r readers of C, and to a different plaintext Pj, using a different key Kj, j=1,2, . . . r and thereby allow one file, C, to replace r separate files specifically communicated to their intended reader. This consolidation helps with managing changes, and version management, and offers great measure of convenience and efficiency in environments like: project management and email correspondence. This solution, Document Management Cryptography, DMC, has a greater impact for projects involving many participants, and where many versions of the project document are being handled. In email correspondence the more people involved the greater the need to use a single email to communicate selectively with one or few of the total set of email recipients. Additional applications involving message authentication, are also enabled via this DMC.

CROSS REFERENCE TO RELATED APPLICATIONS

Provisional Application No. 62/336,477 filed on May 13, 2016, Provisional Application No. 62/339,921 filed on May 22, 2016, Provisional Application No. 62/374,804 filed on Aug. 13, 2016. The above applications were claimed in U.S. patent application Ser. No. 15/594,637, which is continued in parts herein. Further claims: Provisional Applications No. 62/805,369 filed on Feb. 14, 2019; Provisional Application No. 62/813,281 filed on Mar. 4, 2019; Provisional Application No. 62/813,281 filed 4 Mar. 2019; Provisional Application No. 62/850,720, filed May 21, 2019; Provisional Application No. 62/857,898 filed 6 Jun. 2019; Provisional Application No. 62/900,567 filed Sep. 15, 2019, Provisional Application No. 62/926,560 filed Oct. 27, 2019; Provisional Application No. 62/931,807 filed Nov. 7, 2019;

Provisional Application 62/963,855 filed Jan. 21, 2020,
Provisional Application 63/034,401 filed Jun. 4, 2020,
Provisional Application 63/051,652 filed Jul. 14, 2020,
Provisional Application 63/005,062 filed Apr. 3, 2020
Provisional Application 63/140,006 filed Jan. 21, 2021

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

Complex document environments involving frequent updates and large number of people are vulnerable to errors, and inefficiencies, there is a need to develop solutions that would minimize errors, create convenience and enhance harmony in negotiating challenges where issue and people complexities tend to slow down and inhibit efficient project flow.

Executive Summary: Documents used to manage projects involving large number of people pose a formidable organizational challenge: information changes fast, requiring frequent updates of the prevailing documents. Yet, the various people involved have different visibility requirements, so a single project is defined through a large number of documents, each written to the eyes of a subset of the people of the project, who are not supposed to see what other people see. This document variety leads to late updates, and to errors that harm the efficiency of the project. Proposing to solve this problem through the cryptographic notion of composite cipher, CC. A CC ciphertext, C, may be decrypted to n plaintexts $P_1, P_2, \ldots P_n$, using k decryption keys $K_1, K_2, \ldots K_n$. The keys and the ciphertext may be set up so that n readers of the project document will all receive the same document version (encrypted into C), but each will read in C the information that corresponds to the to t keys among the n keys that are in their possession. This will maintain the desired distribution of knowledge among the project people, but will allow the project manager to update a single master version—the one that is encrypted into C. This will solve the problem of chasing various versions of the project document to keep them all up to date. One updated master file is all that is needed. The more people involved in the project, and the more diverse their access permissions, the more effective is this DMC solution. DMC can be used for multi-party messaging, and for message authentication. DMC is also referred to as "Elephant" inspired by the famous Indian story about seven blind men who touched different organs of an Elephant and left with different impressions of the beast.

This figure illustrates a DMC email written by Alice and sent out to Bob, Carla and David. The email has three sections Low, Medium, and High (L, M, H) confidentiality sections. Alice writes in the L section everything her three recipients will need to know. She then adds at the M section information, which Bob is not supposed to see, and in section H Alice adds notes directed to David only. When Bob receives his copy he sees only the writings in section L. He does not know whether or not Alice wrote messages in the M and H sections. Carla's email shows the L stuff but also reveals to her the M section notes. She does not know if David received additional messages. David sees everything Alice wrote. Please note that Alice writes one email, not three, and maintains and keeps one email not three. This situation is accomplished with DMC.

Figure 1:
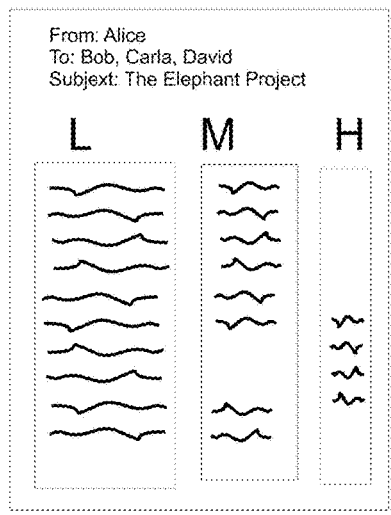
FIG. 1 DMC Email Illustration
Figure 1:
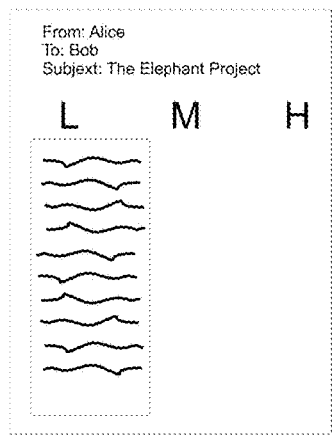
Figure 1:
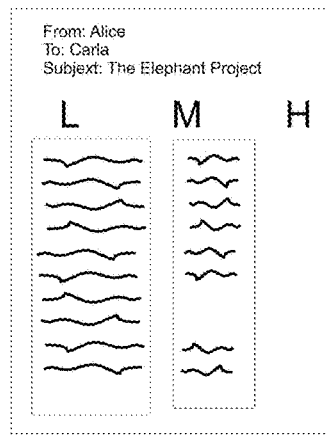
Figure 1:
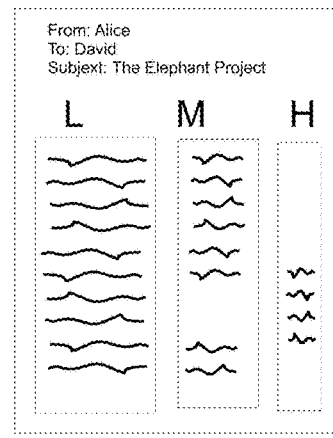
Figure 2:
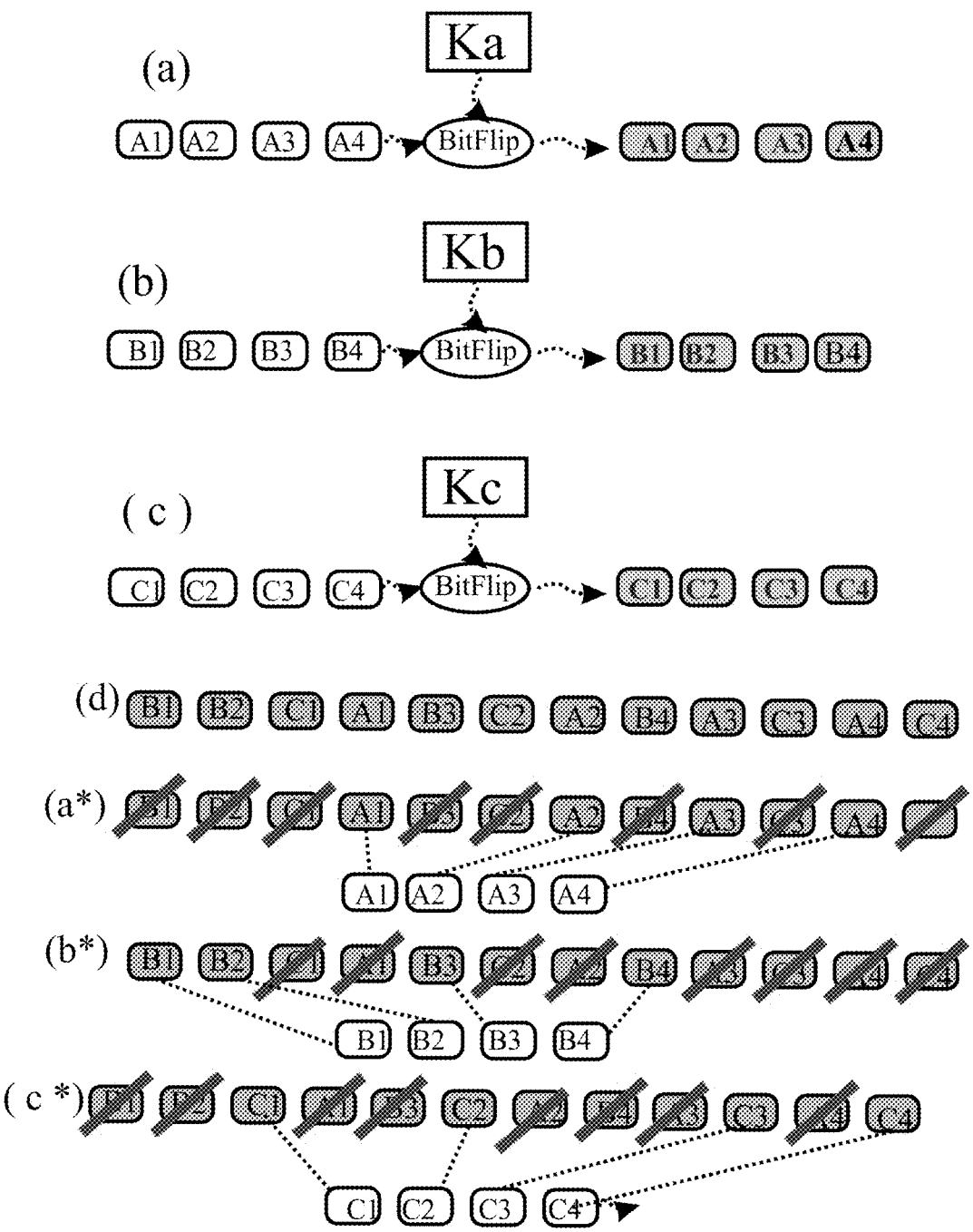

FIG. 2 BitFlip parallel encryption (DMC)

The figure depicts the use of BitFlip to encrypt three messages in parallel. Message (a) is written for receiver A and is comprised of the following letters A1, A2, A3, A4. The message is fed into a BitFlip cipher that is feeding of a key Ka shared with receiver A. The result is the encrypted message letter by letter: A1, A2, A3, A4. The encrypted message is shown in darkened letters. A similar set up is put forth for the connection with receiver B (b) to whom the transmitter wishes to write the message B1, B2, B3, B4, and which is encrypted using BitFlip feeding of key Kb shared with receiver B. The very same happens between the same transmitter and receiver C: message C1, C2, C3, C4 is encrypted using key Kc, the shared key, with receiver C (c). The transmitter then mixes the encrypted letters from the three messages by any order, except that the internal order for each receiver is kept. Namely, letter A1 preceded A2, which preceded A3, which precedes A4. However between any two of these letters can be any number of letters form another message. The same is true for the messages for receivers B and C. The resultant is a string of encrypted letters shown in (d).

Each of the three receivers receives the same string of encrypted letters (d). However each receiver discards the letters that don't decrypt to any letter by his or her key. Line (a*) depicts this situation for receiver A: all the letters in (d) that when tested against Ka don't evaluate to any letter in A's alphabet are discarded. What is left is only the letters A1, A2, A3, A4 encrypted, in the right order. Receiver A will decrypt them using Ka and properly read the message sent to him by the transmitter. Receiver A will not be aware as to whether the discarded letters are just noise, or amount to a different message sent to a different receiver using a different key. Respectively receivers B and C will process the very same string of decrypted letters (d), and each of them will discard all the letters except what is intended for him or her.

Figure 3:
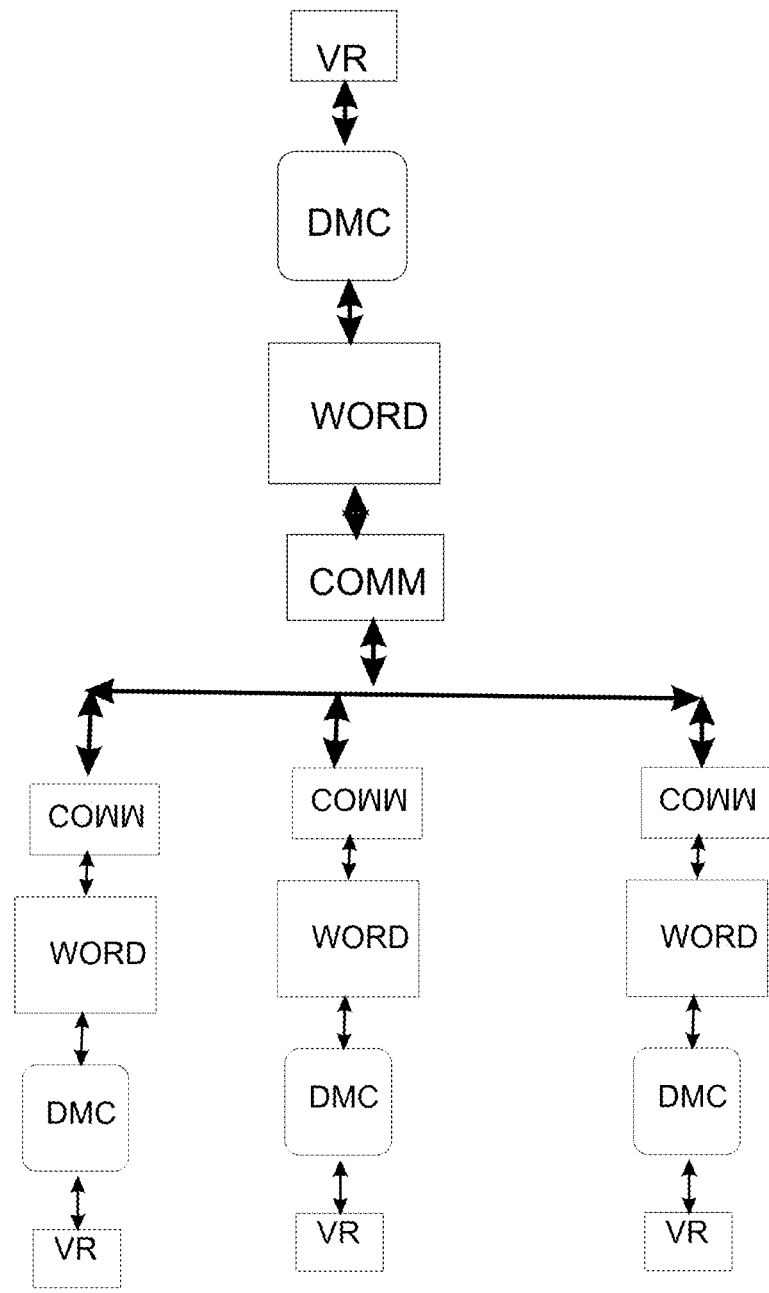

FIG. 3 DMC Configuration

The figured shows a DMC unit where the plaintext is processed for encryption and decryption. It is connected to a VR (version repository) holding past versions of the processed document. The DMC unit is also connected with a WORD processor. It receives the plaintext from it, and submits the encrypted version, and on return its receives the encrypted version and submits the decrypted version. The WORD unit connects to a communication module, COMM to deliver to the network. The figure shows three recipient with similar configuration, receiving the data from WORD and processing it in their respective DMC unit.

Figure 4:
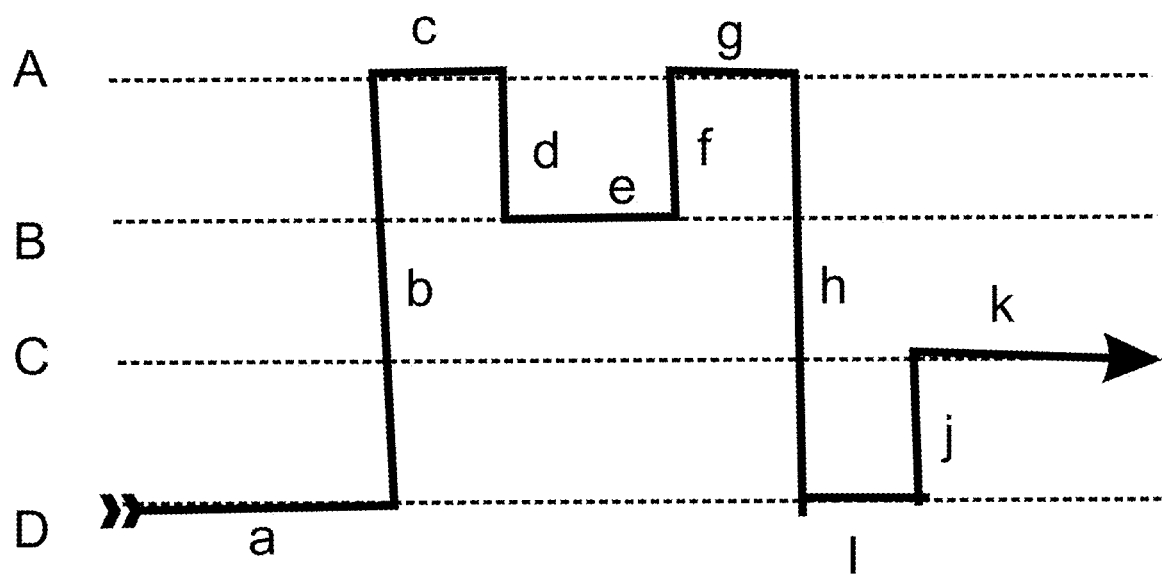

FIG. 4 DMC BitMap Configuration

This figure shows a BitMap configuration where 4 map surfaces (A, B, C, D) are involved. Alice sees map A as content loaded but sees the other maps as contents-less (all 'W'). Similarly Bob sees content in plate B (X, Y, Z, W), and all other are contents-free for him, as described in the continued application. In the same way Carla sees contents only in map C and David sees contents only in map D. The ciphertext is drawn as the line: a-b-c-d-e-f-g-h-i-j-k. As drawn Alice interprets the ciphertext as message A: c-g. All the rest of the ciphertext pathway is contents free for her. Bob sees only message B: e, and Carla sees message C:k. David interprets the very same ciphertext as D:a-i. The vertical sections where the pathway hops from one map the other are contents free for all (these are sections: b, d, f, h, j). A reader equipped with the contents laded maps of Alice and David will decrypt the same ciphertext to: {A+D}: a-c-g-i.

Figure 5:
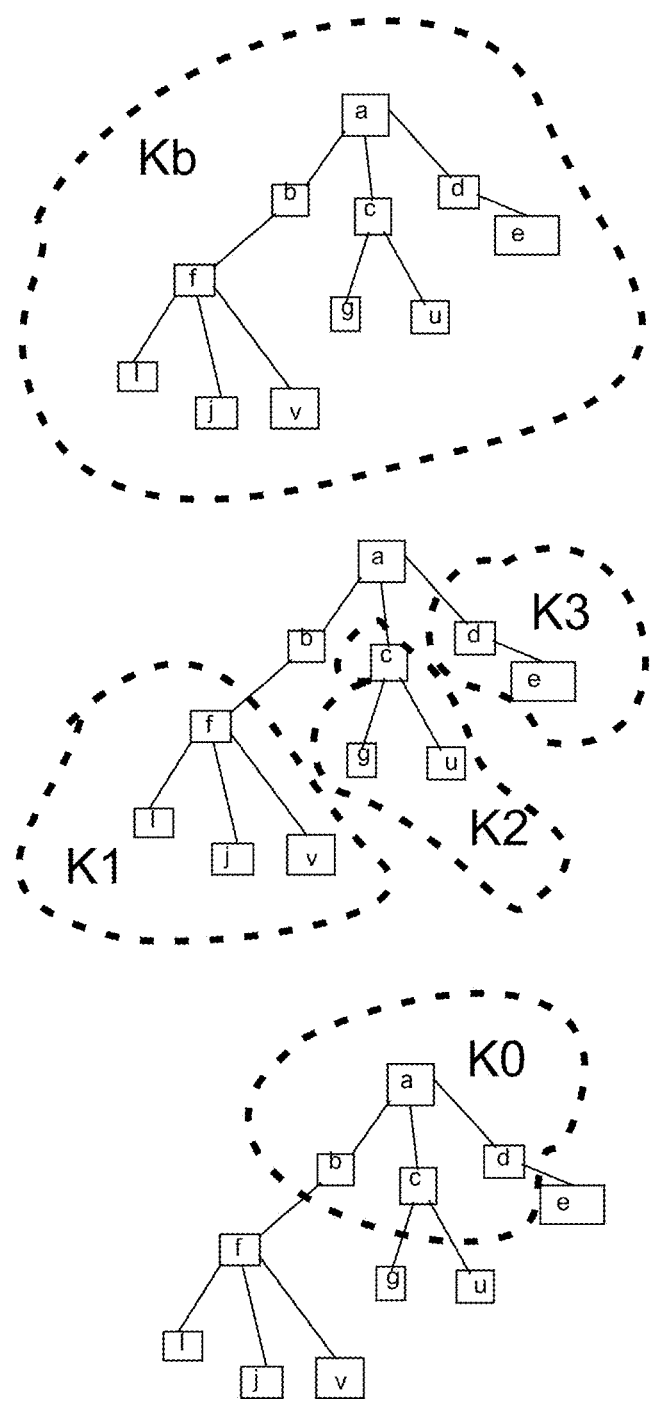

FIG. 5 Document Visibility Groups

This figure shows a hierarchy of project participants with a is the top manager of the project, b, c, d the $2^{nd}$ echelon, f, g, u, e are the $3^{rd}$ echelon and so on. Practicing DMC the project participants will share a base key Kb, which is used in a cipher composite to encrypt messages directed for the attention of all the members of the project, 11 total. Also a 'family' inside the project tree comprised of the local manager f and below him I, j and v all share a key K1 with which they can send each other messages, separately or on top a message sent using Kb for encryption. The same for the sub project group: c, g, u, sharing key K2 and group d, e sharing key K3. The first and second echelon-sharing key. This is a matter of policy whether to allow the higher up elements to share the keys of the lower elements. So the project manager a may be holding kes Kb, K1, K2 and K3 and have visibility over all messages related to the project he or she runs.

CONCEPTUAL DESCRIPTION OF THE SOLUTION

We first describe the environment. A given project involves a people authorized to be exposed to at least part of the project data. They are organized in v "vertical" groups, $V_0 V_1, \ldots V_v$, such that members in group $V_i$ have more visibility than members of group $V_j$ for all i<j where i,j,=1,2, . . . v.

The a people are also organized in h horizontal groups $H_0$, $H_1, H_2, \ldots H_h$ such that the visibility of any group $H_i$ is not exactly as the visibility of any other group $H_j$ for i≠j. By convention group $H_0$ has total visibility of the project.

Let $D_0$ be the master file that reflects the timely status of the project. $D_0$ encompasses all project data. All members of group $V_0$ are authorized to access $D_0$. Let $D_1$ be a subset of $D_0$: $D_1 < D_0$, and let members in group $V_1$ be authorized to access data in $D_1$ but not the rest of $D_0$. Similarly $D_2$ is smaller than $D_1$ and members of group $V_2$ can see it all and not beyond, and so on. Group $V_h$ is authorized to see the smallest amount of data in D.

Let CC be a composite cipher which is used to encrypt $D_0$ to a ciphertext $C=C_0$. The essential property of CC is that there exists a decryption key $K_i$ that would decrypt C to $D_i$, for i=1,2, . . . h.

By equipping members of group $V_i$ with key $K_i$ those members will decrypt C to $D_i$—the exact information that they are authorized to see. This achieves a situation where a single master file $D=D_0$ is updated at a given moment t, then encrypted to C and C is transmitted to all the people involved in the project. Each of the a project people will use his or her cryptographic key and will see exactly and no more of what they are supposed, authorized to see. Next moment a new version will be updated and again encrypted and sent out to all the people on the project and again using each his or her decryption key the people of the project will see the updated version within their access restriction.

People on the project who wish to add to the master file, will do so by using their allocated key to encrypt their contribution and distribute it through all the other people of the project. Individuals lower in rank than the contributors will not be able to see this contribution because their key would not allow them.

For a contributor to inform people lower than him or her it would be necessary to have all the keys of lower echelons and choose the right key for the proper visibility.

The "horizontal" H groups are similarly managed. Each group $H_i$ with access to data $D_i$ will use a key $K'_i$ to decrypt the data it is allowed to read in C. Horizontal grouping occurs when different teams join forces on a same project and they don't wish to share the particulars of their doings, only the summary.

A third grouping involves a data which may be boosted with some comments or annotations. Different groups are allowed to see the same material with different annotations. So for example an executive will annotate personal comments regarding personnel in the team, and these annotations will only be visible by an equal rank or higher executive, not by lower people in the project team.

Such annotations can be used to deliver authentication data. Alice will write a message to Bob. Bob will show the message to Carla. Carla may wish to verify that the note is bona fide. If DMC is used then Alice's message will encrypted and Bob will decrypt it to read the message only. Carla, by contrast, will use her keys to (i) read the message Bob was reading, and (ii) read an extra message added by Alice—but not visible to Bob—assuring her of the validity of the message. This message authentication may take the form of a hash or other advanced cryptographic implements.

Participants will use their keys to encrypt their comments at the desired level. They can limit their entry to their level or up, or to any level below them and up.

DMC CONFIGURATION

Next to the project management there is the DMC management center. The center is responsible for setting up the cryptographic operation and maintaining the single authoritative version of the project document, D. The project management identifies the a people authorized for some access to D. It trains them and hands over to each participant the proper key or set of keys. This handover is done electronically. Participants log in to the project website and receive securely their cryptographic key into their DMC software. The decision of which participants receiving which key (and allowed access to which data) is made by the project management before DMC is activated.

Once the keys are distributed the DMC management center receives D from the project management and encrypts it with the pre selected CC (composite cipher). The resultant C either is posted on the DMC website ready to be pulled down the participants or is pushed down to them. Since all participants receive exactly the same ciphertext, C the distribution can be sequential, Namely one participant passes it along to the next without worrying about data access credentials—this has been taken care of by the proper distribution of keys.

The recipients of C store it on the computing device and decrypt it using the assigned keys when they require access to it. The decrypted version appears on their screen. It is limited to the part of C they were planned to be exposed to. Depending on the nature of the project the screen can be frozen, resist capture or copy, or otherwise be copyable and printable. When participants are done the decrypted version is either kept privately or erased, but the encrypted version remains for any further review, and stays there until a new version of the ciphertext is downloaded from the DMC center.

Any contribution, add on, editing done by a participant will be done with the proper keys to insure that the intended readers and no others will be exposed to the material.

Keys are refreshed as needed. The participating people may be co-located or far apart.

The keys may be software situated or in case of high sensitivity may be installed on a hook-on flash drive and hooked only when used.

CRYPTOGRAPHY

We present two types of composite ciphers. One is based on the continued patent application, BitMap, and the other is based on the BitFlip cipher, as defined in U.S. Pat. Nos. 10,541,808, 10,728,028.

These two ciphers are described briefly below:

BitFlip ciphertext is well disposed to removing any sections thereto which an interpreter sees as noise and contents-free. BitMap, on the other hand, is where the ciphertext needs to be dragged along with all the contents-free sections so that subsequent content sections will be properly readable.

BitFlip

There are k alphabets $A_1, A_2, \ldots A_k$. Each alphabet $A_i$ has l letters $a_{i1}, a_{i2}, \ldots a_{il}$, for $i=1,2, \ldots k$. A message $M_i$ written in $A_i$ is comprised of r letters from $A_i$: $M_i=x_1, x_2, \ldots x_r$, and similarly a message $M_j$ written in $A_j$ is comprised of q letters from $A_j$: $M_j=y_1, y_2, \ldots, y_q$.

The BitFlip cipher allows for the letters of messages $M_i$ and $M_j$ to be interspersed, creating a composite message $M_{ij}$. Meaning: between any two letters in $M_i$, some letters from $M_j$ will be inserted. This 'mixing' will result in a message comprising (r+q) letters where the order of the letters in each message is maintained. Namely letter $x_u$ will appear before letter $x_v$ for any $v>u$, and similarly letter $y_u$ will appear before letter $y_v$ for any $v>u$. For example:

$M_{ij}=y_1, y_2, x_1, y_3, y_4, y_5, x_2, y_6, x_3$

When the composite message $M_{ij}$ is encrypted using BitFlip, it generates the corresponding composite ciphertext $C_{ij}$ where each letter in $M_{ij}$ is individually encrypted. A reader aware only of $A_i$ will regard all the encrypted letters from $A_j$ as noise and will ignore them. This reader will then discern in $M_{ij}$ exactly $M_i$.

$M_{ij}=x_1, x_2, x_3, =x_1, x_2, x_3$

Conversely a reader aware of $A_j$ will regard all the letters from $A_i$ as noise and ignore them, being left with message $M_j$.

$M_{ij}=y_1, y_2, y_3, y_4, y_5, y_6, =y_1, y_2, y_3, y_4, y_5, y_6$

A third reader, aware of both $A_i$ and $A_j$ will be able to separate the two messages $M_i$ and $M_j$ and read them both.

This procedure can readily extended from 2 any number k of distinct alphabets $A_1, A_2, \ldots A_k$. Messages $M_1, M_2, \ldots M_k$ in the respective k alphabets can be mixed such that for every message the order of the letters will not be altered. A reader of one message will regard all the other letters as meaningless noise and will extract only the message written in the alphabet he is aware of.

BitMap

Using a key $K_i$ to interpret a BitMap ciphertext C, one will separate C to contents-subsections, $c_1, c_2, \ldots$ and contents-free subsections $f_1, f_2, \ldots$ namely bit strings that have no message content as visible from some key $K_i$. The contents-free subsections may be dispersed among the contents subsection, and may be of arbitrary length. These contents free subsections cannot be eliminated, because a proper interpretation of subsequent contents section depends on their existence.

An interpreter of C using a different key, $K_j$ may share contents-view sections with the reader using $K_i$, but may also regard other sections regarded as content sections by the i-reader, as contents-free because of using a different key. In addition, the reader using key $K_j$ may see contents in sections seen as contents free by the reader using key $K_i$.

This property may be used create a composite BitMap cipher such that for interpreter using key $K_i$, all the sections of the composite ciphertext C that contain the other (k−1) messages will look contents-free. Such an interpreter will read in C only the messages encrypted with his $K_i$ key.

Fine Tuned DMC

It is simple to apply DMC en-block. Namely, if D is comprised of three documents X, Y, Z, then group $V_0$ will have visibility to X, Y, Z, group $V_1$ will have visibility to documents X, and Y, and group $V_3$ will have visibility document X only. Same can be done with a series of graphics or videos. If D includes figures $F_1, F_2$, and $F_3$, then group $V_0$ will have visibility to $F_1, F_2$ and $F_3$, group $V_1$ will have visibility to graphs $F_2$, and $F_3$, and group $V_3$ will have visibility figure $V_3$ only. Similarly for cuts in audio or video streams.

In a fine tuned distinction some spicy comments will be the difference between participants, or some details on a drawing, or on some graphs, or special comments in an audio or video stream.

Applications

We identify the following application categories:

Multi Party Project Management

Applies to a variety of projects with large number of people of various types: construction and assembly, social and political plans, innovation initiatives, military operations, etc.

Multi Readers Messaging

Regards the common situation where a writer composes a messages for several readers but wishes to add certain messages restricted to some but not all the readers of the basic message.

Subliminal Messaging

Using DMC Alice could send Bob a message for him to pass to Carla, in which Carla can read an add-on (subliminal) message from Alice, which Bob is not aware of.

Message Authentication

The hidden message in the DMC can be used to provide authentication parameters for the main information in the body of the message. So one reader, and not the other would be able to authenticate the main body of the message.

Multi Party Project Management

We consider a document community DC comprising d members. The community operated on the basis of a composite cipher, CC. They share a base key, $K_0$, used to communicate one on one, or broadcast community wide. The DC also shares a key matrix KM, comprised of $k_{ij}=k_{ji}$ keys shared by member i and member j in DC. KM can be used for private messages within the DC.

The case in point is called 'ride on documentation': when a member of the DC, regarded as the 'writer' wishes to broadcast a message M to the DC, on which some particular messages are to be added, intended for particular readers and not others. Let $m_i$ be such a 'ride on' message intended for DC member i for i=1,2, ... d ($m_i$ for a particular i may be null). This will also include self messages, namely messages using a self key $k_{ww}$, for i=w, the writer. This will allow the writer to add notes for himself in the assembled document.

The writer will build up the plaintext P as follows:

$P=M+\Sigma m_i$ ... for i=1,2, ... d

Then the writer will encrypt P using the shared CC to generate the respective ciphertext $C: P \rightarrow C$.

C will be broadcast to the community. Using $K_0$, the community will extract M from $C: C \rightarrow M$, and then each member i if DC will use $k_{iw}$, their shared key with the writer, to extract from C the message intended to them: $C \rightarrow m_i$.

Each member of the community will now see the base message M, annotated with information intended for them. The annotation is not limited in size, and can be larger than M.

The fact that a writer combines several messages to various recipients into one encrypted file C can be used in different ways: (i) peer to peer distribution, (ii) message hiding.

Any C file can be sent to one reader from the writer, and from there any holder of C will push it to another member of DC who has not received it, creating an effective distribution regimen. It can be agreed on successive time intervals between time points: $t_1, t_2, \ldots$ such that each member of the DC will assemble all its messages to the rest of the community and within that time interval in one encrypted file. This will generate $C_1, C_2, \ldots, C_d$ ciphertexts each time intervals, some of these ciphertexts may be empty. These d ciphertexts will be pushed through to the other members of the DC on a peer to peer regimen. A member of DC not finding another member to push a given $C_i$ to, will push it to a 'collecting bin' where post distribution files are dumped to. Any member that would realize that they miss a given C file for a given time interval will look for it in the dumpster (the collecting bin). Since each member gets a C file from all other members, it is not clear to an outside observer without knowledge of the keys who is sending what messages to whom and how often. In other words this DMC regimen hides communication contents and communication pattern as well. The C file can also be distributed from one member of DC to another in a prescribed order.

Joining Documents:

A reader r receives two encrypted files $C_i$ and $C_j$. The reader can decrypt these two files using all the keys in his possession: $C_i \rightarrow P_i$, and $C_j \rightarrow P_j$. The reader will then combine the plain versions: $P_{ij}=P_i+P_j$ and encrypt the combined plainversion: $P_{ij} \rightarrow C_{ij}$. This joined file can be written as:

$C^r_{ij}=C_{ij}=C_i+C_j$

We designate C as $C^r$ to indicate that the joining of the two ciphertexts depends on the set of keys available to the joiner, reader, r.

One may note that the joined ciphertext cannot be propagated within the community in lieu of the two pre-joined ciphertexts because the joined file lost all the messages to which the joiner (reader r) was blind. It also means that if the reader is the perfect reader, or say the root reader then the joint ciphertext can be propagated in lieu of the two, to the extent that the time of their issuance is not critical. A perfect or a root reader is one who knows all the keys in the system.

Multi Readers Messaging

When a writer delivers a message $M_0$ to some r readers $R_1, R_2, \ldots R_r$, she may wish to add a message $m_i$ to reader i only. In the common setting $m_i$ will be readable by all the r recipients of $M_0$. This may not be desired for a variety of reasons ($m_i$ may not be of interest to the others, may offend the others, distract the others, or may be too confidential or too private for the others to read). Using DMC technology the writer will write $m_i$ inside $M_0$, and then encrypt the combined $M_0+m_i=P$ (plaintext), via CC to generate a ciphertext C. Every one of the r readers will decrypt C with the basic key $K_0$, but reader $R_i$ will extract from C $m_i$ using his key $k_i$.

This way the writer can send each reader a private message written as one document with the base message seen by all. The writer can send different private messages to several or all readers, to each his own. This arrangement can be extended to group messaging. A group $G_1$ of some readers may share a special DMC key and the writer will communicate to the entire group a message not seen by non-members of the group.

This arrangement can be done with one writer over a group of readers, but it can also be arranged by a group of r readers, each able to communicate privately as an add-on message over a community (base) message with any other using a bilateral CC key, $k_{ij}$.

The encryption and the key exchange can be set automatically. A group of r communicators will be communicating over a messaging service offering the DMC option. As they all sign in the software will randomly assign CC keys to every two members of the group. The communicators will have a user friendly, easy way to indicate to the software which parts of the text are designated as private.

Let Alice Bob, Carla, and David form an DMC group. Alice writes to the group ($M_0$): "Hey All, let's plan a picnic on the beach on Saturday. Meeting by the big rock at 11:00 am!" Alice wishes for Bob to pick her up since her car is in the garage, and she wishes to tell Carla not to wear the red bathing suit, since it does not look good on her. Her message might look:

"Hey All, let's plan a picnic on the beach on Saturday. Meeting by the big rock at 11:00 am!" <crypto reader=Bob>Bob, could you pick me up from my place, my car is in repair</crypto>, <crypto reader=Carla>Carla, please don't wear the red bathing suit, it does not look good on you</crypto>.

All three readers will see the basic message, Bob will see his private message and Carla will see hers.

Document Management Cryptography

Illustrative Description and More Cryptographic Options

Version Management, Archival, and Need-to-Know Efficiency

Project management implies a maze of documents that easily get out of hand, hamper efficiency, snap tight nerves, and is altogether agonizing. Solution: a single set of project documents, where each document is inclusive of all relevant information: basic (visible to all), restricted (visible to middle and upper management), and sensitive (visible to upper management only). The documents are sent, received and stored in one way (encrypted). Each echelon decrypts each document with its own key so that the decrypted version exposes only what that reader is meant to see. Similarly each echelon adds, writes to each document such that higher echelons can read it, all lower echelons will read only if marked for their attention. No restriction on number of echelons. This order allows for today's maze of project documents to function as intended, while managed with a fraction of the effort because no matter how many echelons are involved, there is only one single document to send, receive, store, and retrieve. Instead of document variety, we offer key-variety. Document Management Cryptography simplifies the drudgery of document management, makes the work environment more pleasing, and much more profitable.

Introduction: To understand what DMC is about, let's describe a generic project management environment comprised of a project manager, an executive team, middle management, and staff. (There may be more echelons, but the three are enough for our purpose). As the project evolves it is expressed through a growing number of documents. The project documents include: 1. public domain project data (public), 2. widely shared non-public project data (staff), 3. management restricted data (management), 4. executive grade sensitive data (executive). Usually the basic parameters of the project may be announced and become "public". Work plans, schedules, quantitative computation is data worked out the staff ("staff" data); Considerations, risk analysis, expectations, cost figures, HR data is developed by middle management, ("management"), and above that there are financing data, risk sharing, high level business scenarios that are the purview of the top echelon ("executive"). Data exposure is clear upward, and opaque downward. It is therefore that document management is dividing documents according to their data contents. This implies separation. Executive data is written into 'executive-only' documents, management data is written to management and executive only documents, and staff data is written into non-public documents. It is a management burden to keep these categories apart. There are many reported situations where confidentiality was inadvertently breached when an executive holding documents of executive level mixed with management level, and further mixed with staff level and public domain levels. One document slips to the wrong category, "spills the beans", often without a trace.

Apart from mistakenly crossing categories, there arises the challenge of "version management". Let document $D_1$ be a staff document, containing data $S_1$. Let document $D_2$ be a management document, containing $S_1$ and management data $M_1$. At a later point in time $S_1$ is updated (new version). The project management team now has to insure that the update $S_1$ to $S'_1$ will be carried out in $D_1$ and in $D_2$. And possibly in $D_3$—the executive document containing $S_1$. Since there are several documents that contain the same staff data $S_1$, it is a burden to insure a uniform update.

So why not separate the data so that each project document will contain only data contained in that category? This is not practical because the data tends to be intertwined. For example cost data of various elements of the project may be marked and identified over a description of these elements. The cost data may be 'management level' and the 'elements' description may be staff level.

Not only is version and exposure management a daunting challenge while the project is ongoing, it remains so when the project is concluded, but the data must be retained for any future accounting, tax auditing, and general good management practice. One has to insure that the data sensitivity considerations are honored indefinitely after the project has concluded.

This headache and burden of sorting out documents according to their data exposure requirement is growing exponentially with the size of the project. There are more documents because there are more parts, there are more versions because the project lasts longer, and there are more echelons of management and supervision because of the increased complexity.

It is this very issue of version and exposure management of project data that is addressed by the Document Management Cryptography.

The Concept

The underlying idea of DMC is to handle one document only. One document to be shared by all, one document to send, to receive, to store by all levels, and echelons, and even by the public.

On its face this principle will violate the requirement for data exposure management.

It certainly looks that way, but it is not. In fact, the generated, transmitted and stored document has zero exposure per se. Not the public, not the staff, not management, and not even the executive echelon will be able to read it. The reason: it is encrypted!

And each echelon is given a reading key with which the encrypted document is decrypted to show in plain language only the data proper for that echelon.

Imagine the project manager writing the initial project plan. It contains some basic parameters to be exposed to the public (P), some project details needed by the staff, some restricted data aimed at the middle management (M), and then some sensitive data to be read by the executive team (E).

As the document leaves the project manager's desk, it is encrypted. And the cryptogram is spread out to everyone involved. When the press gets a hold of that project document they can read only the P portion. When a member of the staff comes around she uses her staff key, and the encrypted document is decrypted for her, showing only the public data and the staff data (P+S). A middle manager will approach the very same document and see in it the public portion, the staff data, and the management data (P+S+M). And every executive will use his executive key and read in the very same document the public portion, the staff data, the management information, and the executive material.

When each document reader concludes the reading, the decrypted version dissolves, and disappears, and only the encrypted version is kept, ready to be re-invoked at any time, maintaining the data exposure regimen every time it is used.

And what if a staff member is taking the document generated by an executive, and wishes to add, elaborate, modify? He would do so in plain language, of course, modifying only the parts that he can see (what does not decrypt is not visible to the reader), and save it with a different name before distributing the modified document to its proper distribution list. The revised document will be seen with the revisions and modifications by all staffers, all managers and all executives. The managers and the executives will see the changes side by side with the restricted and sensitive data that the staffer did not see.

All in all, the normal project development is taken place and every document is maintained once and interpreted differently as if the system were to handle a multitude of documents to honor data exposure requirements.

For example, a staffer may send a manager a document that the manager misplaced. The manager, using his management key will be able to read in that document the management only stuff that the staffer was blind toward.

The DMC simply relocates the data exposure discrimination to a new device called a "reading key" which allows the system to deal manage, transmit and store one and only version.

Operation:

The nominal operation of the DMC may be divided to categories:
Writing & Reading DMC documents
Storage & Retrieval Management Writing and Retrieving DMC Documents There are three categories of writers: executives, managers, and staffers. Executive writing: Executive Aron is writing project document (d) comprised of information at staff level, (s), information for managers, (m) and material for fellow executives (e). Document (d) is encrypted using DMC and its encrypted version (d') is produced. (d') is routed to all project people—same document. The copy that is being accessed by execute Bill is decrypted with Bill's executive reading key that opens up the full document (d) for Bill's attention. The copy of (d') that is accessed by manager Charlie is decrypted with the manager's key, and exposed before Charlie the (d) document without the executive information in it. Respectively Staffer David reads the same copy with his staffer's key, and what he sees is only the (s) data—designed for his attention.

Manager Alice writes document (d). Nominally Alice is expected to only write to her level (managers) and below (staffers). As above the encrypted document (d') is read for its m and s information by all managers and executes, while staffers see only the s-information.

As a matter of policy a company might encourage all project people to report to higher echelon anything they deem important and that does not get properly addressed at their level. Using DMC a staffer would be able to address management or the executive level, and the same for managers towards executives. This is a mechanism to 'whistle blow' and otherwise communicate discreetly with higher ups. One should notice that if a staffer writes for an executive she herself would not be able to read back what she wrote because she does not have the executive key. Note: this implementation requires the use of asymmetric cryptography. It is designed to let lower echelon people to communicate to higher up levels without going through channels.

It's clear from this operation that a writer will be expected to designate with respect to anything he writes, what is the level of project exposure associated with that writing.

Storage and Retrieval Management

Project documents will all be stored in their encrypted form, and a key management system will have to be setup to allow each to read at his or her level, when retrieving an old document. Over time old documents might be relaxed as to their restrictions, and eventually everyone will be given the executive key to read sufficiently old papers.

Email Use

Writing an email to several recipients, the writer will properly mark data that is exposed to some readers and not to others. The writer will see all the data, but when he saves the email, or sends it out the email will first be encrypted using the BitFlip cipher with the co-encryption option. This will generate a shared encrypted file that will be read by each recipient such that whatever is not to be exposed to that reader will not show up, and there will be no indication that there is more data that is not seen by the reader.

The reader will then be able to add to the email using his key, and only intended readers will be able to see it. The selection of readership may be based on organizational hierarchy, or be based on interest.

For example in describing the technological device, some readers will only wish to know what the device does, and be spared the details of the mathematical foundation or the technological assembly and construction features. Others will wish the math and not the hardware details, and others the opposite. So each reader category will have a key that exposed him or her to what they wish to read.

Cryptography

The Document Management Cryptography may be accomplished in various schemes. We present two:
The exponential method
The rubber method Multiplicative DMC generates an encrypted document of size where is the size of the unencrypted file, the plaintext, p, and t is the number of echelons served by the DMC. The price paid for the benefits of the DMC is a considerably larger file for both transmission and storage.

The rubber method is based on U.S. Pat. No. 6,823,068. The encrypted file is somewhat larger than |p|, but is requires more preparation for each document.

The DMC exponential method is based on alphabet A comprised of a=u*v letters, (u,v positive integers). All the letters of the alphabet are listed in a random order in u*v matrix: u rows and v columns. This is called the base matrix: M1.

Matrix M1 associated with two matrices: M1u and M1v, each of size u*v. M1u is placed next to M1 and M1v is placed above or below M1. M1u is called the horizontal key of matrix M1, and M1v is called the vertical key of M1. M1 together with its horizontal and its vertical keys (three matrices altogether) are called the "M1 key set", and M1 is its base.

Mu (the horizontal key of M1) may be regarded as a base for its own key set. Its horizontal key would be regarded as Muu, and its vertical key would be regarded as M1uv (M1uu and M1uv are both u*v matrices).

Mv (the horizontal key of M1) may be regarded as the base for its own key set. Its horizontal key would be regarded as M1vu, and its vertical key would be regarded as M1vv (M1vu, and M1vv are both u*v matrices).

The nomenclature continues with the same order, accordingly one could properly interpret matrices designated as M1vuuvv, and M1uuvvuuuv, . . . etc.

We now describe The DMC Exponential of the Frist Order:

Any letter $m_{ij}$ in the A alphabet appears in matrix M1 in row i and column j. When $m_{ij}$ appears in the plaintext, it is replaced by two letters: the first letter is a random selection from row i in matrix M1u, and the second is a random selection from column j in matrix M1v.

As described the M1 key set will enable encryption of any plaintext of any length written in the A alphabet. The size of the so generated ciphertext is twice the size of the plaintext, because any letter of the plaintext was replaced with two ciphertext letters.

Because of the random selections a given plaintext p will be encrypted to n different cipher texts $c_1, c_2, \ldots c_n$ if encrypted n times. And the longer the plaintext the lower the odds that any two of the n ciphertexts will be identical, even for high n values.

Decryption proceeds symmetrically. The intended reader will read in the ciphertext two letters at a time. Find which row in Mu the first letter is written—i, and which column the second letter in the ciphertext is written in matrix Mv—j, and then retrieve $m_{ij}$ in M as the corresponding plaintext letter.

By construction it is clear that all the $c_1, c_2, \ldots c_n$ ciphertexts will decrypt to the same generating plaintext p.

The M key set is the key to execute the DMC Exponential method of the 1st order.

We will now describe the DMC Exponential method of the 2nd order:

We consider two plaintexts $P_1$ and $p_2$ of the same length: $|p_1|=|p_2|$. We shall encrypt $p_1$ letter by letter as described above (in the DMC Exponential of the 1st order), with one important change. Instead of selecting random letters from M1u and M1v respectively, we will select letters as guided by another u*v matrix, M2. As follows:

Let a be the first letter in $p_1$, and let b be the first letter in $p_2$, let a be in position (i,j) in M1 (row i and column j). To encrypt a we need to select a letter from row i in M1u, and a letter fro column j in M1v.

Let row i in M1u be:

$g_1, g_2, \ldots g_v$

And let column j in M1v be:

$h_1, h_2, \ldots h_u$

Let b (the first letter in $p_2$) be found in location (i',j') in M2. Accordingly instead of a random selection from the set: $g_1, g_2, \ldots g_v$, we shall select $g'_j$, and instead of a random selection from the set: $h_1, h_2, \ldots h_u$, we shall select $h'_i$.

A recipient of the ciphertext, who is not aware of M2 will decrypt the pair: $g'_j$-$h'_i$ as a (based on his knowledge of the M1 key set). However, an intended recipient who is aware of M2 will interpret the same set ($g'_j$-$h'_i$) as the encryption of the letter a from $p_1$, but in parallel she will interpret the same pair as the encryption of b from $p_2$.

It will work similarly for the subsequent letters in $p_1$ and $p_2$. The same ciphertext c will be interpreted as $p_1$ by the holder of M1, M1u, and M1v, and will be interpreted also as the letters comprising $p_2$.

We say then that the DMC of the 2nd degree is a setup that encrypts two plaintexts $p_1$ and $p_2$ in parallel such that one key holder decrypts the ciphertext c back to $p_1$, and the other encrypts the same to $p_1$ and to $p_2$.

Using the 2nd degree, the randomness used to pick coordinates markers for the plaintext letter, is being replaced with a chosen pair such that this choice reflect the identity of the in-parallel plaintext letter that is encrypted with this procedure.

The idea of replacing a letter with two so called marker letters that define this letter through its coordinates in a letter matrix, may be extended indefinitely and build a set up where any number n of in-parallel plaintexts are encrypted through the same cryptogram. This can enable the discrimination between readers who know all the involved matrices and can therefore decrypt the combined ciphertext to all the n plaintexts $p_1, p_2, \ldots p_n$, and between other readers who don't have possession of all the keys, and assume that the selected ciphertext letters were picked randomly.

Let's Examine now the DMC Exponential of the 3rd degree:

We recall that in the 2nd degree a letter was picked (c2) from matrix M1v such that its column indication identifies the column address of letter p in M1, and its row address identifies row address of p' in M2. Operating at the 3rd degree one does not identify c2 outright but rather relate to two adjacent matrices: M1vv and M1vu such that c2 may be identified via any element in M1vv in column j, and via any element in M1vu on row i'. Any random selection will do. Albeit, we assume the existence of a third plaintext, p3, and wish to encrypt in parallel the next letter from it. Tahat would be letter p". p" is marked in M3 in coordinates (i",j"). We will now identify i" by choosing a letter c3 from column j in M1vv because c3 will be at row i". And we also pick letter c4 from M1vu such that its column is j" and its row is i'.

The respective ciphertext sequence will be c1-c3-c4, where c3-c4 is identifying p" and c2, and c1-c2 is identifying p' and p.

Only a writer who is aware of all the involved matrices can accomplish this feat where three plaintext sequences p1, p2 and p3 are encrypted in tandem to a single ciphertext sequence c1-c3-c4. As it is evident the number of matrices used rises exponentially and hence the name An intended reader of all the encrypted messages will be aware of all the matrices and decrypt the ciphertext sequence backwards. From the identity of c3 and c4, the reader will identify p" in M2. From the same element the reader will identify c2 in M1v, and from the identity of c2 and c1 the reader will identify p' and p, and thereby read the corresponding letters of all the three plaintexts.

An intended reader who is supposed to read only p1 and p2, and not p3, will not be aware of M2, and interpret c3 and c4 only as some random choices to identify c2. That reader will also identify c1, and from c1 and c2 the reader will identify p and p' (and not p"), and read p1 and p2.

DMC Exponential Illustration

Let alphabet A be comprised of 8 letters: 0,1,2,3,4,5,6,7 (000,001,010,011,100,101,110,111). Clearly this alphabet will handle all binary strings. We set A in a u*v=2*4=8 randomly organized table:

4 7 1 0

M1=5 3 2 6

We write, M1u:

5 4 3 6

M1u=7 1 2 4

We write, M1v:

1 6 5 2

M1v=3 7 0 4

Which is all we need to exercise DMC in the first degree. We then add M2 matrix to exercise DMC in a 2nd degree, and matrix M3 to exercise DMC in the 3rd degree. The following pages illustrate that practice.

Key implementation parameters are:
1, Alphabet choke
2. level management
3. Security Enhancement
alphabet choice The illustration herein is shown with a very limited alphabet of 8 letters. As mentioned this alphabet and the illustration are sufficiently robust to encrypt any size plaintext. If practiced via l levels, then using 3l matrices, then the practice involves a key space K of size |K|:

$|K|=(8!)^{3l}$

For only two levels this amount to a whopping $|K|=4.3*10^{27}$ And in general for an alphabet A comprised of a=u*v letters, the key space will be:

$|K|=((u*v)!)^{3l}$

It is not necessary to use DMC with $2^n$ letters n bits long each. However it adds some simplicity and generality to the system. A base-64: 8*8 setup seems inviting. Each matrix comes with a key space of $64!=1.27*10^{89}$.

The larger the matrices, the greater the intractability of the cipher—exponentially. Albeit the encryption decryption effort is proportional to the size the matrices, by the nature of the encryption and decryption process. It is therefore that one can choose to increase the matrix size, pay a proportional increase in nominal processing, and gain an exponential benefit in intractability. And since the encryption/decryption processes are the same regardless of the size of the matrix, one can code the encryption and decryption to be useable with any size matrix decided by the user of the cipher (who may not be a cryptographer neither a programmer). It implies that the project manager will be able to choose different strength (size) keys for different project depending on the sensitivity of the project.

The size of the matrices may be of such size that for messages of sufficiently small size the DMC cipher will offer Shannon secrecy. This can be readily figured out since for small enough messages, given a random ciphertext, one could match it with a proper size random plaintext, by filling in the rubrics in the large matrices. Namely, it is possible under such conditions to match any ciphertext with any plaintext—a property directly linked to Shannon secrecy.

The DMC Exponential may be implemented with as many levels as desired. Let there be an implementation of l levels. To increase the level to l+1, it would be necessary to add the level l+1 substitution matrix Ml+1, and two coordinating matrices M . . . v and M . . . u.

In other words, we may add 3 alphabet matrices for each level. So the total cryptographic key for l level DMC is 3l. It may be noted that as a bare minimum it is necessary to keep secret M1, M2, . . . Ml while the other (the coordinating) matrices may be put in the clear.

One may practice dec implementation in which DMC is practiced at level l, but appears to be practiced at a higher level l'>l. This practice confounds the cryptanalyst, and allows for smooth upgrade from l to l'.

In a decoy implementation one selects randomly the letters from the coordinating rows and columns (as in DMC of the first degree), and hence only M1 is needed. There is no need here for M2, M3, Ml.

Illustration: with respect to the 3rd degree illustration above: one only encrypts p=1 2 3 4. p1=1, which may be identified via M1u and M1v as: [5 4 3 6] [5 0]. A random choice reduced the options to (4,0). The letter O in M1v is expressed via M1vv and M1vu as: [3 4 7 1][1 0], which again is reduced to a random choice of (1 1). We have thus encrypted p1=1 to c1=(4,1,1). It appears as a three level DMC implementation, but it is a decoy because there are no M2 and M3 involved, only M1.

To decrypt c1=(4,1,1) to p1=1 one would first regard the (1,1) letters. According to M1vu and M1vv (1,1) points to letter O in M1v, so (4,1,1) is reduced to (4,0). The combination (4,0) in M1u and M1v unequivocally points to p1=1.

When DMC is practiced with a group where different members have different level keys, then a low level key holder may practice a decoy procedure with respect to the levels above his grade. A cryptanalyst will have no means to identify such encryption is decoy, but group members who are aware of the higher level keys will readily realize that decoy is being practiced because they can't read any plaintext of a higher level (above the writer's level), since it would look as random (because decoy is practiced through random selection).

Reduced Level Implementation It is readily possible to implement DMC over a single plaintext stream. Let a plaintext P be comprised of letters p1, p2, One could artificially define the sequence: p1, pl+1, P2l+1 as plaintext stream P1, and p2, pl+2, as plaintext P2, etc. and then encrypt l letters in parallel. Similarly the levels can be reduce from l to any desired level.

Security Enhancement
The security offered by this cipher may be enhanced via:
  key replacement
  linking with a randomizer cipher
  Dummy levels
Key Replacement:
If the key is switched and changed often enough, then the data used with a particular key might not be enough for a conclusive cryptanalysis. On the other hand it is so much more convenient to run a particular project with the same key from start to finish.

One powerful way to change keys is to use a 'complete transposition cipher': all matrices are permutations of each other. And hence, all or some of them can be transposed to another matrices every so often. The "so often" may be based on time, on rounds of use, etc.

One may note an anomaly, the higher levels are more vulnerable to cryptanalysis than the lower levels, so it may be the higher levels that may need to consider transposition.
Linking with a Randomizer Cipher Cryptanalysis of DMC is based on the low entropy of the plaintext. For example: a raw brute force cryptanalysis where one tries one matrices configuration after the other, and used the ciphertext on each, then all configurations that result in a plaintext that does not read as a proper plain message is discarded. One would then precede the DMC cipher with any 'randomizer cipher' (e.g. DES) that genera a random looking ciphertext. It would be that ciphertext that would be fed as input to the DMC. Cryptanalysis of the DMC will not be possible as before, but will have to be linked with brute force analysis of the randomizer cipher. It would be the combined strength of the randomizer cipher and the DMC cipher that will determine the cryptanalytic barrier.

This security enhancement will work also work with each level independently. It is possible for example to pre-encrypt the level 3 message, and not the levels below. The key for level 3 need not be shared with other levels.

Dummy Levels: Every level of the DMC may be operating on a purely random basis. Let p1, p2, . . . pl be the l plaintexts feeding into a DMC. While each of these plaintexts may be a meaningful message, it may also be a random sequence. The way the DMC operates, each level may choose on its own to be "randomized" and meaningless, and that decision will not affect the other levels. So the whole DMC set up may be churning out meaningless messages, or perhaps only one, two or any subset of the l levels may encrypt a meaningful message. The cryptanalyst will be in the dark about this decision. It is therefore a very powerful means to enhance security. In particular one could erect a DMC for sale l=5 levels, and use only two levels meaningfully: level 1 and 3, and the rest will be randomized. At any point, stealthily some previously randomized levels will be taken up for service of a meaningful message.

Cryptanalysis

The DMC Exponential by its nature is not based on algorithmic complexity and rather on the quantity of randomness in its key. Therefore there is no concern for some smart mathematical cryptanalysis offering an algorithmic shortcut. Cryptanalysis will proceed on the basis of the expected low entropy of the plaintext, and on the mounting constraints we more and more data is used via a fixed key. Such cryptanalysis may be appraised on combinatorics grounds.

Advantage Over Common Practice

The idea of separating project data according to sensitivity and 'need to know' is old and in common practice. In particular one could simulate the operation of the DMC by having data at various security levels encrypted via a key known only to members of this level or of higher levels. And so achieve the same functional capability touted by DMC.

Such separate encryption scheme will artificially and tenuously tie the information from different levels to each other. Any level will be able to "fly solo", advance to higher revision levels, irrespective of the other levels. This cannot happen in DMC. When the per level cryptography is separated from the other levels, it is necessary to manage a complicated key regimen so each level will have the updated keys for the levels below. The DMC regimen implies non-repudiation. While higher levels will be able to hide their content from lower levels, they could not deny that content, should there by a subsequent inquiry.

Also, the DMC may operate formally with l levels, but actually with 0<r<l levels only, while the other l-r levels are 'dummy', operate without a guiding matrix but rather through random selection of letters. And the user can readily, temporarily, add another level or more (increase the value of r), and those changes are unknown to the cryptanalyst. It creates a great measure of security to the DMC user.

Since the highest level is of the lowest security, it may be desirable to use one or more 'dummy' levels above the actually used highest level.

Theory: The DMC may be reduced to a nominal cipher that generates an n-letters ciphertext from n-letters plaintext. As reviewed elsewhere a DMC operating with l levels may view a plaintext stream P comprised of letters p1, p2, . . . as a merged stream of l independent streams P1, P2, Pl, as follows:

P1: p1, pl+1, p2l+1
P2: p2, pl+2, p2l+2
Pl: pl, p2l, p3l . . .

In this interpretation the DMC may be regarded as a universal cipher because every plaintext stream of size n bits which encrypts by some other cipher to a ciphertext of n bits may also be encrypted to the same ciphertext, by creating a matrix with elements of size n letters. or by finding integers l, u v such that:

n=l*2u*v and define a DMC with l levels, comprised of 2u over 2v size matrix where the elements will be all the strings of size u*v bits. Such a DMC by construction will encrypt every n bits long plaintext to the same n bits long ciphertext that the emulated cipher encrypts to.

Accordingly, any block cipher in particular may be associated with an equivalent DMC. For example 128 bits block size AES may be constructed via a 4 levels DMC with matrices the size of 16×16 bits comprised of 4 bits long elements. The DMC version of this instance of AES will be free of the AES concern for a mathematical shortcut, (at a price of a longer key), and will also compete well performance wise the AES computation.

Overview of the Invention

The invention describes a document management cryptography system called DMC supporting a multi-party project, serving to manage knowledge distribution to all relevant parties where parties are each limited to their sphere of project knowledge, and no further, by consolidating project documentation D to a single master file, P, updated as necessary, wherein P is encrypted to a corresponding composite ciphertext C, then C is distributed to the parties such that each party extracts from C only the information it is authorized to see, and no more; thereby eliminating the need for many project documents adapted to each party based on their information exposure credentials, and since it is a burden to timely update these many project documents, having one master file P serving all relevant parties is a distinct functional advantage; so doing by using a composite cipher, CC, which generates the composite ciphertext C corresponding to the plainversion of the project master file, P, and that decrypts to an arbitrary number p of plaintexts $P_1$, $P_2$, . . . $P_p$, by decrypting C with respective cryptographic keys: $K_1$, $K_2$, . . . $K_p$, such that $P_i$=Decrypt(C, $K_i$), for i=1,2, . . . p, a party in possession of k of the p keys will extract from C the plaintexts corresponding to these k keys, and no more.

The invention further describes the DMC system where parties are configured in a hierarchy of h echelons: $H_o$, $H_1$, . . . $H_h$ wherein the parties of each echelon share an echelon key, parties in echelon $H_i$ share a decryption key $K_i$, and where parties in echelon $H_i$ have possession of the following keys: $H_i$, $H_{i+1}$, . . . $H_h$, and where parties in echelon $H_0$ will extract from C all the information used to encrypt it.

The invention further describes the DMC system for a a case where one is using k alphabets $A_1$, $A_2$, . . . $A_k$. Each alphabet $A_i$ has l letters $a_{i1}$, $a_{i2}$, . . . $a_{il}$, for i=1,2, . . . k, and where a message $M_i$ written in $A_i$ is comprised of $r_i$ letters from $A_i$ for i=1,2 . . . k, and where the letters from the various alphabets are mixed but without changing the order of letters of the same alphabet thereby creating a composite plaintext of k messages, P, then encrypting P to the corresponding composite ciphertext C, and where a reader of C decrypting C with key $K_i$ corresponding to $A_i$ will disregard all the parts of C which are not an encryption of letters in $A_i$. This cryptographic embodiment of the composite cipher is further elaborated on in U.S. Pat. Nos. 10,541,808, 10,728,028.

Yet another cryptographic embodiment is described as a key $K_i$, to interpret the composite ciphertext C, by separating C to contents carrying subsections, $c_1$, $c_2$, . . . and contents-free subsections $f_1$, $f_2$, . . . namely bit sequences that have no message content as interpreted by key $K_i$; the contents-free subsections may be dispersed among the contents subsections, and may be of arbitrary length; wherein an interpreter of C using a different key, $K_j$ will share some or none of the contents-carrying sections with the reader using $K_i$, but will also interpret other sections regarded as content-carrying sections by the $K_i$ reader, and in addition, the reader using key $K_j$ will see contents in sections seen as contents free by the reader using key $K_i$. This embodiment is further described in the continued application.

The invention extends the DMC to where the communication to the parties takes place in an email environment, allowing a writer to write and send a message M to r readers, where M is annotated with n notes $N_1$, $N_2$, $N_n$, directed to some, but not all, of the r readers, and where these notes will not be visible by readers for whom a note is not targeted, by encrypting $M+N_1+N_2+\ldots N_n$ so that the corresponding ciphertext C will be decrypted to M by a key $K_0$ known to all the r readers, $M=Decrypt(C, K_o)$, and C will also be decrypted to $N_i$ using key $K_i$ which is known only to the readers for whom note $N_i$ is intended, $N_i=Decrypt(C, K_i)$.

Yet another application relates to security: where a primary message is accompanied by a secondary message containing cryptographic parameters through which a reader with the proper key to read the secondary message can authenticate or qualify the primary message.

The DMC configuration dynamics may be described for particular embodiment (among many) as follows: The document management cryptography module DMC is connected to a word processor unit WORD, and where a human writer uses WORD to write a text message M and designate sections of M to be read by designated readers; WORD will then communicate the so designated text message M to the DMC module; the DMC module will be in possession of bilateral cryptographic keys between the writer and each of the designated readers, and will be in possession of a composite cipher, CC, used by the DMC module to prepare a composite ciphertext C of M: C=CC(M), and then the DMC module will communicate C back to WORD, then WORD will activate an associated communication module COMM to communicate C to a network where the designated readers receive C to their respective communication modules, and from there to their respective WORD module, wherein WORD is passing C to the readers DMC module, which is equipped with one or more of the bilateral keys used by the writer, and is also in possession of the same composite cipher used by the writer; the cipher with the available key(s) decrypts C to the message designated for each recipient (reader), and then this decrypted message is passed to the recipient WORD module where the human reader at the recipient station comes to see the message destined for their attention.

What is claimed is:

1. A document management cryptography method called DMC acting in a novel process that achieves operational efficiency, and behavioral convenience,
   supporting the conduct of a project involving a plurality of human participants (parties)
   where each party project data exposure is to be limited to designated sections of the full project data;
   by consolidating project documentation D to a single master file, P,
      wherein P is encrypted to a corresponding composite ciphertext C, then C is distributed to the parties for each party to extract from C only the parts containing the information it is designated to see, and no more; thereby eliminating the need to divide the project data, D, to a plurality of files, passing to each party the file that carries the information designated for that party;
   the method further comprising:
   (a) functional setup:
      (i) identifying n parties (people) authorized to be exposed to at least part of the project data, D;
      (ii) organizing the n parties in v vertical groups $V_0$ $V_1, \ldots V_v$, wherein members in group $V_j$ have more visibility than members of group $V_i$ for all $i<j$ where i,j, =1,2, ... v;
      (iii) organizing the n parties in h horizontal groups $H_0, H_1, H_2, \ldots H_h$ wherein the visibility of any group $H_i$ is not the same as the visibility of any other group $H_j$ for i≠j,
   (b) cryptographic setup:
      (i) identifying v keys $K_1, K_2, \ldots K_v$ so that: $D_i=Decrypt(C, K_i)$ for i=1,2, ... v,
      (ii) passing to the each of the p parties one or more of the v keys;
      (iii) identifying h keys $K_1, K_2, \ldots K_h$ so that: $D_i=Decrypt(C, K_i)$ for i=1,2, ... h,
      (iv) passing to the each of the p parties one or more of the h keys
   (c) encrypting P to C using a composite cipher CC;
   (d) communicating C to the p parties;
   (e) each party using the keys in its possession to decrypt C to the parts of P designated for that party exposure.

2. A method as in claim 1 where parties are configured into a hierarchy of q echelons: $U_0, U_1, \ldots U_g$ wherein the parties associated with each echelon share an echelon key, parties in echelon $U_i$ share a decryption key $K_i$, and where parties in echelon $U_i$ have possession of the following keys: $K_i, K_{i+1}, \ldots K_q$ corresponding to echelons $U_i, U_{i+1}, \ldots U_q$.

3. A method as in claim 1 using n alphabets $A_1, A_2, \ldots A_n$, each alphabet $A_i$ has l letters $a_{i1}, a_{i2}, \ldots a_{il}$, for i=1,2, ... n,
   and where the project data, (message) $P_i$ is written in $A_i$ and is comprised of $r_i$ letters from $A_i$ for i=1,2 ... n,
   and where a collection of n messages, P, is a collection of the letters from various alphabets, these letters may be mixed in their combined order but without changing the order of letters of a given message, thereby creating a composite plaintext of n messages, P then encrypting P to the corresponding composite ciphertext C, using for each message $P_i$ the key $K_i$ associated with alphabet $A_i$, and where a reader of C decrypting C with key $K_i$ corresponding to $A_i$ will disregard all parts of C which are not an encryption of letters in $A_i$.

4. A method as in claim 1 using a key $K_i$ to decrypt the composite ciphertext C, by separating C to contents-carrying subsections, $c_1, c_2, \ldots$ and contents-free subsections $f_1, f_2, \ldots$ namely bit sequences that have no message content as interpreted by key $K_i$;
   wherein decryption of C using a different key, $K_j$ will share some or none of the contents-carrying sections with the party using $K_i$, but will also extract content from other sections regarded as content-carrying sections by the party using $K_j$, and in addition, the party using key $K_j$ will decrypt contents in sections of C seen as contents-free by the party using key $K_i$.

5. The method in claim 1 where the communication to the parties takes place in an email environment, allowing a writer to write and send a message M to r readers (parties), where M is annotated with t notes $N_1, N_2, \ldots N_t$, directed to some, but not all, of the r readers, and where these notes will not be visible by readers for whom a note is not targeted, by encrypting $M+N_1+N_2+\ldots N_t$ so that the corresponding ciphertext C will be decrypted to M by a key $K_0$ known to all the r readers, $M=Decrypt(C, K_o)$, and C will also be decrypted to N using key $K_i$ which is known only to the readers for whom note $N_i$ is intended, $N_i$=Decrypt(C, $K_i$).

6. The method in claim 1 where a primary message Mp is accompanied by a secondary message Ms, containing cryptographic parameters through which a reader with a proper key for reading the secondary message, can authenticate the primary message, proceeding as follows:

a writer composing Mp will provide authentication data for Mp in the form of Ms, then use a composite cipher to encrypt Mp+Ms to C, where the intended readers of the primary message will use a key Kp to decrypt C to Mp, while only a reader who in addition to Kp holds a key Ks will be able to decrypt C to both Mp and Ms, and then use the information in Ms to authenticate Mp.

7. The method in claim 6 where Ms is comprised of a digital signature of Mp signed by the writer using their private key, and where a reader using Ks to decrypt C to Ms will validate Mp based on the corresponding public key of the writer.

8. The method in claim 1 where a document management cryptography module DMC is connected to a word processor program (WPP), and where a human writer uses the WPP, to write a text message M and designate sections of M to be read by designated readers;

the WPP will then communicate M to the DMC module;

the DMC module will be in possession of bilateral cryptographic keys between a writer and each of the designated readers, and will be in possession of a composite cipher, CC, used by the DMC module to prepare a composite ciphertext C of M: C=CC(M), the ciphertext C will be communicated to all the designated readers;

each designated reader will use its key in its copy of the DMC, to decrypt C to the section of M which the writer intended for this reader to read.

9. The method in claim 8, respectively applied to graphics, audio and video, where instead of the WPP one applies a graphic processor, an audio processor, and a video processor.

* * * * *